United States Patent [19]
Kempas

[11] Patent Number: 5,220,261
[45] Date of Patent: Jun. 15, 1993

[54] METHOD OF CALIBRATING HIGHLY PRECISE ROBOTS

[75] Inventor: Hagen Kempas, Überlingen, Fed. Rep. of Germany

[73] Assignee: Bodenseewerk Gerätetechnik GmbH, Fed. Rep. of Germany

[21] Appl. No.: 841,832

[22] Filed: Feb. 26, 1992

[30] Foreign Application Priority Data

Mar. 19, 1991 [DE] Fed. Rep. of Germany ....... 4108939

[51] Int. Cl.$^5$ ...................... B64C 17/06; B25J 19/02; G01C 19/42
[52] U.S. Cl. .................................. 318/567; 318/649; 318/568.22; 318/574; 901/45; 901/46; 395/93
[58] Field of Search ................ 318/560–640, 318/649; 395/80–99; 901/3, 9, 10, 15–23, 30, 46, 47

[56] References Cited

U.S. PATENT DOCUMENTS

| | | | |
|---|---|---|---|
| 4,119,900 | 10/1978 | Kremnitz | 318/587 |
| 4,500,823 | 2/1985 | Walrath | 318/632 |
| 4,556,940 | 12/1985 | Katoo et al. | 318/587 |
| 4,674,048 | 6/1987 | Okumura | 318/587 |
| 4,698,775 | 10/1987 | Koch et al. | 901/46 |
| 4,794,547 | 12/1988 | Nishida | 901/3 X |
| 4,819,184 | 4/1989 | Jonsson et al. | 901/9 X |
| 4,919,586 | 4/1990 | Derby | 901/45 |
| 4,949,026 | 8/1990 | Mead | 318/649 |
| 5,023,533 | 6/1991 | Ishikawa et al. | 318/568.21 |
| 5,047,701 | 9/1991 | Takarada et al. | 318/568.1 |
| 5,049,797 | 9/1991 | Phillips | 318/568.16 |

Primary Examiner—Paul Ip
Attorney, Agent, or Firm—Lee, Mann, Smith, McWilliams, Sweeney & Ohlson

[57] ABSTRACT

A method of calibrating highly precise robots having a plurality of arms and axes comprises the method steps of: attaching an angular rate sensor (30) at an arm of the robot, adjusting the arm to a predetermined nominal position, generating an angular rate about an axis (40) of the robot, comparing the angular rate measured by the angular rate sensor (30) about its input axis (46, 48) with the nominal component of the angular rate generated about said axis (40), which nominal component results for the nominal position, and correcting the parameters of the robot according to the deviation of the measured angular rate and the nominal component.

5 Claims, 3 Drawing Sheets

METHOD OF CALIBRATING HIGHLY PRECISE ROBOTS

The invention relates to a method of calibrating highly precise robots of the type having a plurality of arms and axes.

BACKGROUND OF THE INVENTION

Robots are known which have a plurality of arms which are mutually rotatable about two axes each. A first arm is rotatably mounted about a first axis (roll axis) relative to a base. On the first arm, a second arm is rotatably mounted about a second axis (pitch axis) which is perpendicular to the first axis. Further, the second arm is rotatable about a third axis (roll axis) perpendicular to the second axis. Finally, an outermost arm carries a tool holding fixture through which a tool can be connected to the arm. This outermost arm is likewise connected rotatably about a pitch axis to the next inner arm and, in addition thereto, rotatable about a roll axis. Known robots have, for example, six such axes (pitch and roll axes). The arms are moved by servomotors which operate about different axes. The servomotors are energized by suitable signals to position the tool.

For the exact positioning of a tool held in the tool holding fixture the joints between the arms have to execute exactly defined rotational movements about the various axes. Sources of errors result from inaccuracies of the angle pick-offs, by misalignments of the axes or by longitudinal errors of the arms, which can be due to manufacturing tolerances or thermal dilation. Therefore, it is necessary to calibrate the robot.

The robots can be measuring or assembling robots.

It is known to move the tool of the robot to determined known positions. These positions can be formed by surfaces of a calibration body. The errors can be mathematically determined from the deviations of the attained positions of the tool from the known "desired positions".

These known methods are only partly usable for a six-axis robot. The calibration is only valid for a limited spatial area. Not all of the essential error terms can be determined. the handling is very complicated.

It is the object of the invention to calibrate robots with as low expenditure as possible and with high accuracy.

SUMMARY OF THE INVENTION

According to the invention this object is achieved by the method steps of:
(a) attaching an angular rate sensor having an input axis at an arm of the robot,
(b) adjusting said arm to a predetermined nominal position,
(c) generating an angular rate about an axis of the robot,
(d) comparing the angular rate measured by the angular rate sensor about said input axis with the nominal component of the angular rate generated about said axis, which nominal component results for the nominal position, and
(e) correcting the parameters of the robot according to the deviation of said measured angular rate and said nominal position.

The angular rate sensor can operate in each possible position of the robot. Thus, the calibration is not limited to a limited spatial area of positions of the robot. Thus, errors of the robot can be determined for all of the positions, and all of the essential errors for the compensation of such errors can be determined. No calibration bodies are required.

The angular rate sensor can be attached to a tool holding fixture at the outermost arm of the robot. The angular rate generated about said axis and the nominal position can be chosen such that the nominal component of this angular rate is zero. When then the angular rate sensor indicates an angular rate, this angular rate signal is a measure for the misalignment of the axis. Advantageously, the method according to the invention is carried out in such a way that, starting from the longitudinal axis of the outermost arm carrying the tool holding fixture, successive axes of the robot are measured and the errors thereof are compensated by correction of the parameters. In this way, at first one axis is corrected with regard to its alignement error. Then, taking this correction as a basis, the next axis can be corrected etc. A two-axis rate gyro can be used as said angular rate sensor. Advantageously, the two-axis rate gyro is then attached to the tool holding fixture of the robot such that its spin axis coincides with the nominal axis of said outermost arm carrying the tool holding fixture and its input axes are perpendicular to this nominal axis.

Of course, it is also possible to correct each axis independently of adjacent axes depending on the procedure and robot kinematics. Instead of measuring an angular rate about one axis, the angular rate sensor can also measure angular rates about two axes, which are compared to associated nominal components.

BRIEF DESCRIPTION OF THE DRAWING

An embodiment of the invention will now be described in greater detail with reference to the accompanying drawings.

DESCRIPTION OF THE PREFERRED EMBODIMENT

Figure 1:
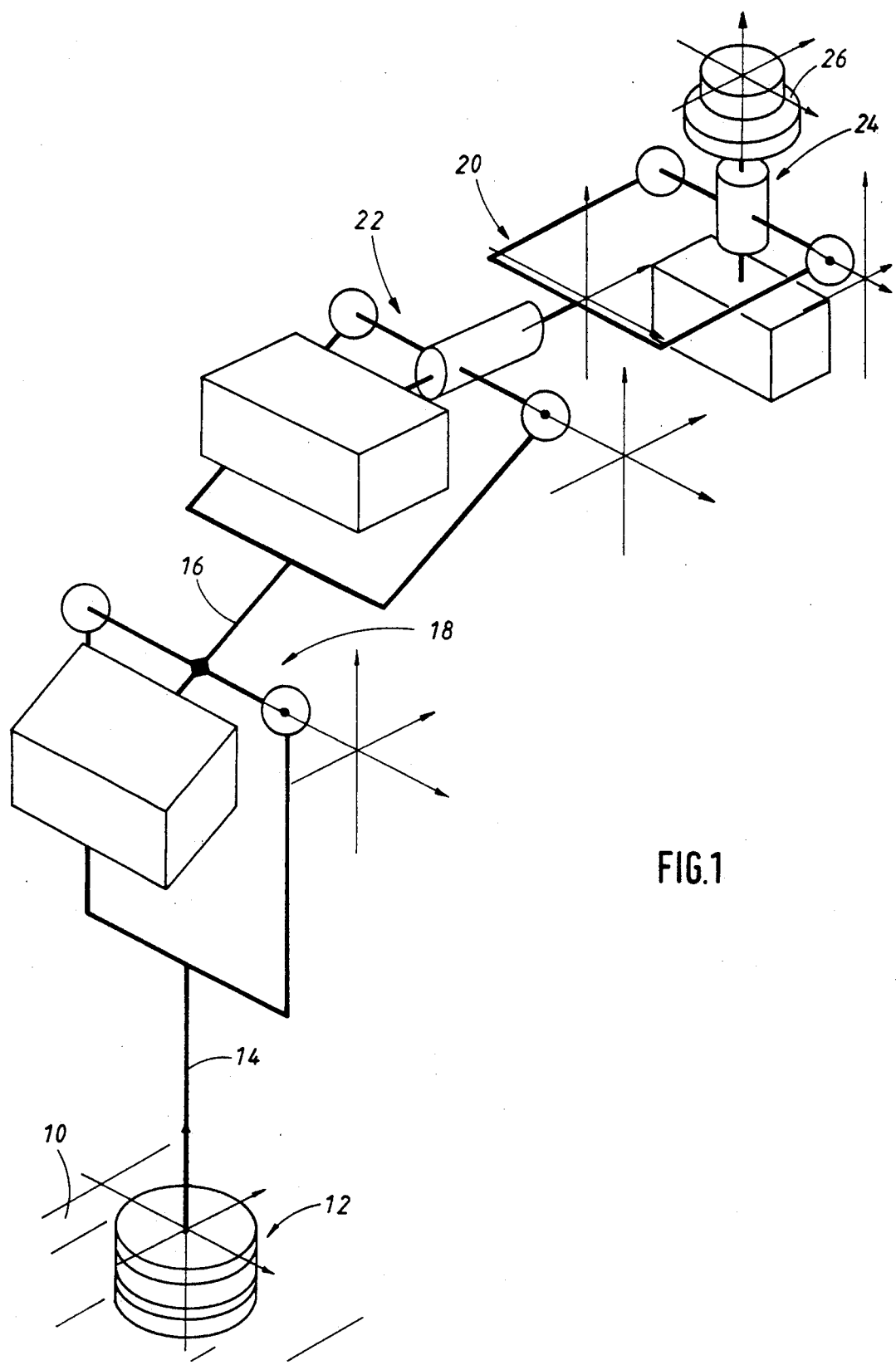
FIG. 1 shows perspectively a kinematic model of a six-axis robot having a two-axis rate gyro held in the tool holding fixture.

In FIG. 1 A1 designates a first axis of the robot. The first axis A1 is vertically arranged in a base 10. A robot is rotatable in bearings 12 about the axis A1 by a servomotor (not illustrated). To this end the servomotor can be energized by control signals. A (likewise not shown) angle sensor supplies the rotary angle about the first axis A1. The first axis A1 forms the longitudinal axis of a first arm 14 extending vertically.

A second arm 16 is rotatable about a second axis A2 relative to the first arm 14 by means of a joint 18. The second axis A2 extends perpendicularly to the first axis A1. Furthermore, the second axis A2 extends perpendicularly to the longitudinal axis of the second arm 16. Thus, the second axis A2 is a pitch axis.

A third arm 20 is rotatably mounted about a third axis A3 relative to the second arm 16 by means of a joint 22. The axis A3 extends parallely to the second axis A2. Furthermore, the arm 20 is rotatable about its longitudinal axis. This longitudinal axis forms the fourth axis A4 of the robot. The fourth axis A4 is perpendicular to the third axis A3. The third axis A3 is a pitch axis, the fourth axis A4 is a roll axis.

A fourth arm 24 is rotatably mounted on the third arm 20 about a fifth axis A5. The fifth axis A5 extends perpendicularly to the fourth axis A4. Furthermore, the fourth arm 24 is rotatable about its longitudinal axis. This longitudinal axis is the sixth axis A6 of the robot. The sixth axis A6 is perpendicular to the fifth axis A5. The fifth axis A5 is a pitch axis. The sixth axis A6 is a roll axis. The fourth arm 24 is the outermost arm of the robot. The fourth arm 24 carries a tool holding fixture 26 at its outer end. For calibration, a two-axis rate gyro is held in this tool holding fixture such that its spin axis coincides with the sixth axis A6.

The arms 16, 20 and 24 can likewise be rotated about the axes A2, A3, A4, A5 and A6, respectively, by (not illustrated) servomotors. The positions in question are picked-off by (likewise not illustrated) angle sensors. The servomotors can be energized by control signals such that each arm is in a certain angular position in pitch and roll relative to the adjacent arms.

Figure 2:
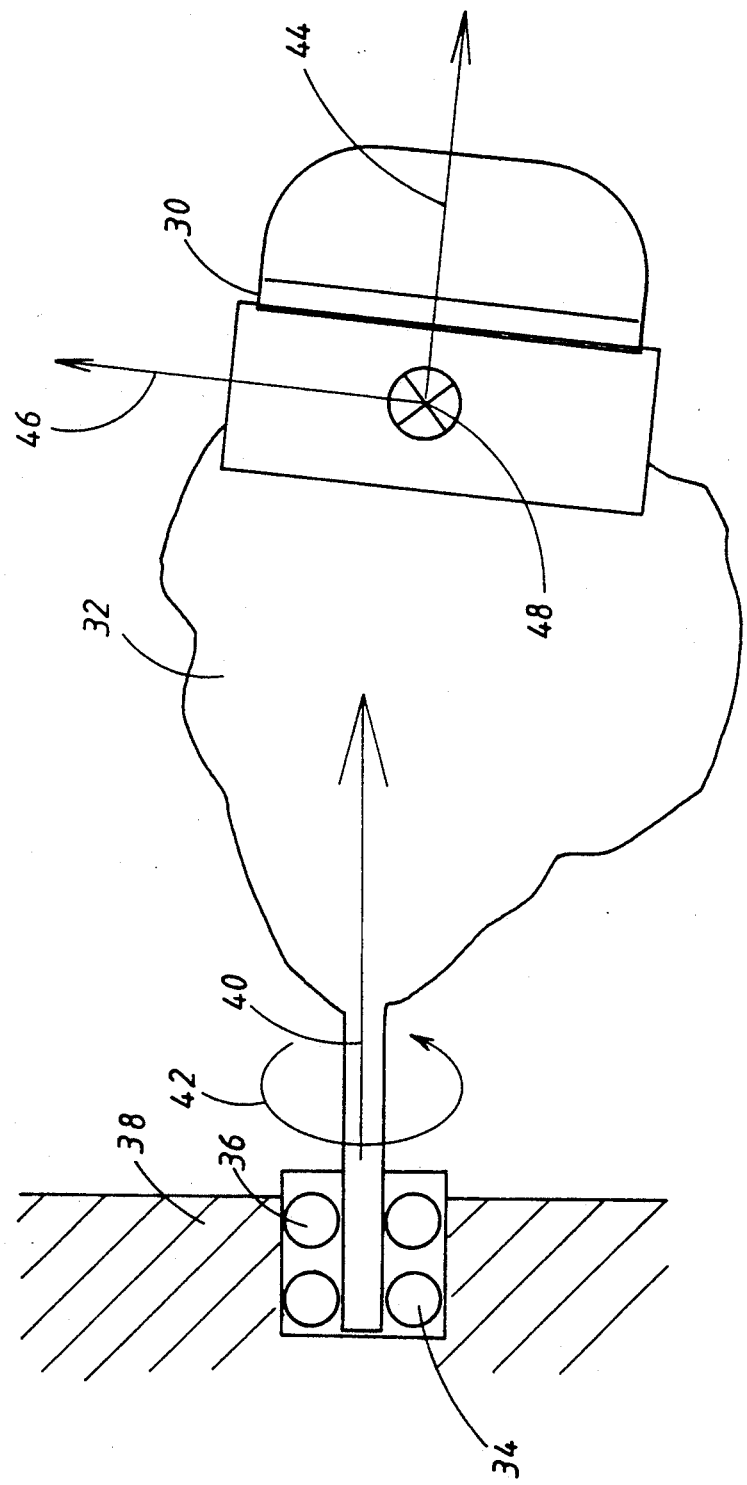
FIG. 2 is a schematical illustration and illustrates the calibration of a robot by means of a two-axis rate gyro.

FIG. 2 schematically illustrates, how a two-axis rate gyro 30 can be used for the determination of deviations of the axes from a nominal position.

The two-axis rate gyro 30 is attached to the tool holding fixture of a robot. The robot can be any type of multiple-axis robot, for example a six-axis robot as illustrated in FIG. 1. Here, the robot is generally indicated schematically as "measuring body" 32. The robot is rotatably mounted in bearings 34 and 36 about an axis 40 relative to a base 38 and is driven about this axis 40 relative to the base 38. This is illustrated by the arrow 42.

The two-axis rate gyro 30 has a spin axis 44 and two input axes 46 and 48. The input axes 46 and 48 are mutually perpendicular and perpendicular to the spin axis. The two-axis rate gyro 30 is arranged such that, in the position of the robot to be measured, nominally, that means when the system has no alignment errors, the spin axis 44 of the rate gyro 30 is parallel to the axis 40 about which the robot is driven. When no alignement errors are present, the input axes 46 and 48 do not sense any components of the angular rate. If, however, alignment errors are present, components of the angular rate occur at the input axes 46 and 48. If these components are put in relation with the impressed angular rate, then the alignment error angle can be determined therefrom. Then it is possible to take these errors into account in the mathematical transfer model of the robot.

Figure 3:
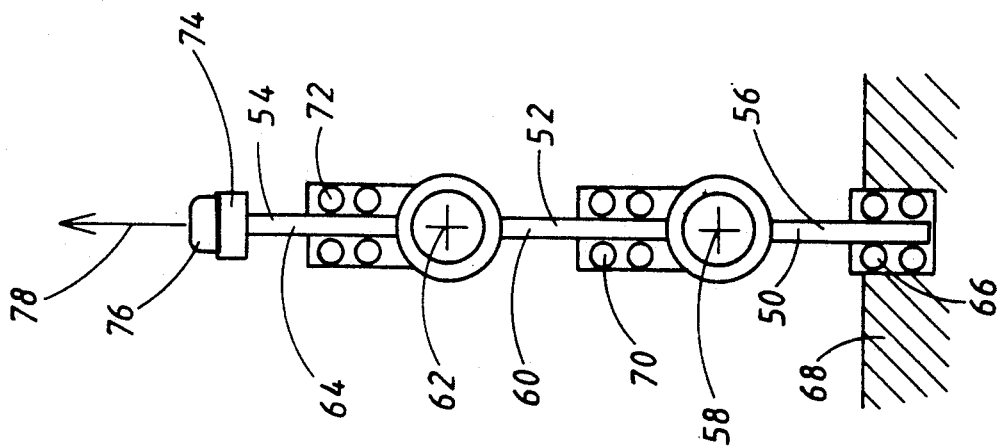
FIG. 3 is a principle illustration of a robot having a two-axis rate gyro held in the tool holding fixture, this rate gyro serving to calibrate the robot.

FIG. 3 shows a five-axis robot having three arms 50, 52 and 54. The arms are movable relative to each other about axes 56, 58, 60, 62 and 64.

The first arm 50 is rotatable in bearings 66 about the vertical first axis 56 relative to the base 68. The first axis 56 is a longitudinal axis of the arm 50 and thus a roll axis. The arm 52 is pivotable about the second axis 58 relative to the arm 50. The second axis 58 extends perpendicularly to the first axis 56. Thus, the second axis 58 is a pitch axis. Furthermore, the second arm 52 is rotatable in bearings 70 about its own longitudinal axis, namely the third axis 60. The third axis 60 extends perpendicularly to the second axis 58. The third axis 60 is also a roll axis. The third arm 54 is pivotable about a fourth axis 62 relative to the second arm 52. The fourth axis 62 extends perpendicularly to the third axis 60. The fourth axis 62 is a pitch axis. Furthermore, the third arm 54 is rotatable in bearings 72 about its longitudinal axis. This longitudinal axis is the fifth axis 64. The fifth axis 64. The fifth axis 64 is perpendicular to the fourth axis 62. The fifth axis is also a roll axis.

A tool holding fixture 74 is located at the end of the third arm 54. The tool holding fixture 74 carries a two-axis rate gyro 76. The rate gyro 76 is attached to the tool holding fixture 74 such that its spin axis 78 extends in the direction of the fifth axis 64. The input axes of the rate gyro are mutually perpendicular and perpendicular to the spin axis.

Figure 5:
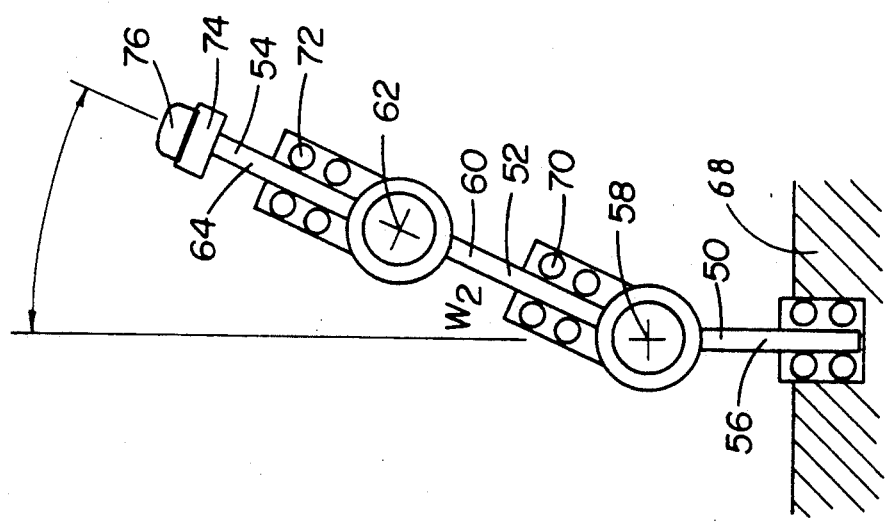
FIG. 5 is an illustration similar to FIG. 3 and illustrates the calibration of the second axis, likewise a pitch axis, the error angle likewise being illustrated in a strongly exaggerated manner.
Figure 4:
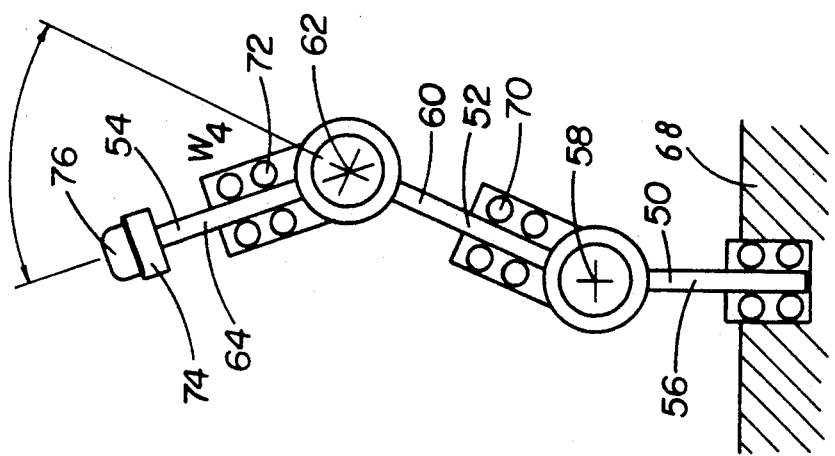
FIG. 4 is an illustration similar to FIG. 3 and illustrates the calibration of the fourth axis (pitch axis), the error angle being illustrated in a strongly exaggerated manner.

The calibration of such a robot will now be described with reference to FIGS. 4 and 5 in a two-dimensional example. For simplicity, it is assumed that all of the alignment errors only occur in the paper plane of FIGS. 4 and 5.

The third arm 54 is driven about the fifth axis 64. Then, the rate gyro theoretically should not detect any components of the angular rate at its two input axis. If, nevertheless, angular rate signals occur at the input axes, then these signals are due to alignment errors between rate gyro and third arm 54. The spin axis 78 is not exactly aligned with the fifth axis 64. These signals can be compensated. Then the rate gyro 78 behaves as if it were correctly aligned with the fifth axis.

For calibrating the fifth axis the robot is moved to a stretched position which nominally corresponds to the position of FIG. 3, that means that all of the roll axes 50, 52 and 54 are aligned. Then the second arm 52 is driven about the third axis 60. If the fifth axis 64 were exactly aligned with the third axis 60, then the rate gyro 76 should not sense any components of the angular rate at its input axes. Occurring components can be put down to the fact that the third axis 60 and the fifth axis are not exactly aligned. There is an alignment error which is illustrated in a strongly exaggerated manner in FIG. 4 by the angle $W_4$. In FIG. 4 it is assumed that the servomotor and angle sensor have an angle error $W_4$ about the axis 62.

Then the signals of the rate gyro 76 can be used to correct the control signals which are applied to the servomotor active about the fourth axis such that the fifth axis 64 is aligned with the third axis. Then a situation exists as illustrated in FIG. 5. The third and the fifth axes 60 and 64, respectively, are exactly aligned. Theoretically, also the first axis 56 should be aligned with the third and the fifth axes 60 and 64; respectively.

Now the first arm 50 is driven about the first axis 56. Again, with an alignment error $W_2$ which is illustared in a strongly exaggerated manner in FIG. 5, a component of the angular rate results at the input axis located in the paper plane of FIG. 5. This component is indicative of the alignment error. The control signal for the servomotor active about the second axis 58 is corrected such that finally all of the roll axes 56, 60 and 64 are exactly aligned as illustrated in FIG. 3.

The corrections of the control signals are also valid in other positions of the robot.

In this way the different axes of the robot can be successively calibrated. With the desired method, the calibration is effected in each step only for one axis without at the same time having to take alignment errors of the other axes into consideration. In a three-dimensional consideration, two gyro signals result at the two input axes of the two-axis rate gyro 76 for each of the roll axes. Therewith, correction signals are not only applied to the servomotors operative about the pitch axes but also to the servomotors which are operative about the next inner roll axes. The correction signals result for each roll axis from only two equations having two unknown quantities.

The calibration of the pitch axes 58 and 62 can be effected in the following way:

The servomotors operative about the pitch axes 58 and 62 are energized with oppositely equal angular rates with nominally parallel orientation, as illustrated in FIG. 3. Then, the orientation of the rate gyro 76 should remain the same. If, however, the pitch axes are not exactly parallel, components of the angular rate occur at the two input axes of the rate gyro. These are again indicative of the alignment errors of the pitch axes. These alignment errors can be compensated by correction signals at the servomotors operative about the next inner roll axes.

I claim:

1. A method of calibrating robots of the type having a plurality of arms, adjacent ones of said arms being interconnected to be rotated by servomotors about robot axes under the control of control signals comprising the steps of
   (a) attaching to one of said arms of said robot an angular rate sensor for sensing angular rate of said sensor relative to inertial space about an input axis,
   (b) commanding, by said command signals, a configuration of said robot wherein said one arm is supposed to assume a predetermined nominal position,
   (c) generating an angular rate about one of said robot axes different from said input axis, whereby said rate sensor is supposed to sense, about said input axis, a predetermined nominal component of said generated angular rate depending on said commanded configuration of said robot,
   (d) measuring by said angular rate sensor the actual angular rate about said input axis,
   (e) comparing said actual angular rate measured by said angular rate sensor about said input axis with said nominal component of said generated angular rate, and
   (f) applying corrections to parameters of control signals of said robot in accordance with the deviation of said actual angular rate and said nominal component of said generated angular rate to compensate for deviations of at least one robot axis from its nominal orientation.

2. A method as claimed in claim 1, wherein an outermost arm of said robot carries a tool holding fixture and said angular rate sensor is attached to said tool holding fixture.

3. A method as claimed in claim 1, wherein said commanded configuration of said robot is selected to make said nominal component of said generated angular rate zero.

4. A method of calibrating robots of the type having a plurality of arms, adjacent ones of said arms being interconnected to be rotated by sevomotors about robot axes under the control of control signals, said robot axes including alternating roll axes extending longitudinally of one of said interconnected arms and pitch axes extending transversely to said interconnected arms, an outermost one of said arms having a tool holding fixture at its end, said tool holding fixture being rotatable about an outermost robot axis, comprising the steps of
   (a) attaching to said tool holding fixture an angular rate sensor for sensing angular rate relative to inertial space about an input axis, said angular rate sensor being attached nominally with said input axis orthogonal to said outermost robot axis,
   (b) generating an angular rate about said outermost robot axis, whereby said rate sensor is supposed to sense, about said input axis, a zero nominal component of said generated angular rate,
   (c) measuring by said angular rate sensor the actual angular rate about said input axis, and
   (d) correcting control signals of said robot in accordance with said actual angular rate to compensate for deviations of said outermost robot axis from its nominal position,
   (e) commanding, by said command signals, a configuration of said robot wherein said outermost arm and another of said arms are supposed to be rotatable about parallel outer and inner pitch axes,
   (f) generating oppositely equal angular rates about said parallel pitch axes, whereby said rate sensor is supposed to sense, about said input axis, a zero nominal component of said generated angular rates,
   (g) measuring by said angular rate sensor the actual angular rate about said input axis, and
   (h) applying corrections to parameters of said control signals of said robot in accordance said actual angular rate to compensate for deviations of said outer pitch axis from its nominal position,
   (i) commanding, by said command signals, a configuration of said robot wherein said outermost robot roll axis is supposed to be aligned with the next inner one of said roll axes,
   (j) generating an angular rate about the next inner one of said roll axes, whereby said rate sensor is supposed to sense, about said input axis, a zero nominal component of said generated angular rate,
   (k) measuring by said angular rate sensor the actual angular rate about said input axis,
   (l) correcting control signals of said robot in accordance with said latter angular rate to compensate for deviations of said next inner roll axis from its nominal position, and
   (m) repeating said procedure with successive pitch and roll axes.

5. A method as claimed in claim 1 wherein a two-axis rate gyro is used as said angular rate sensor.

* * * * *